No. 689,687. Patented Dec. 24, 1901.
H. NEWCOME.
ICE CREAM CUTTER.
(Application filed Sept. 21, 1901.)
(No Model.)
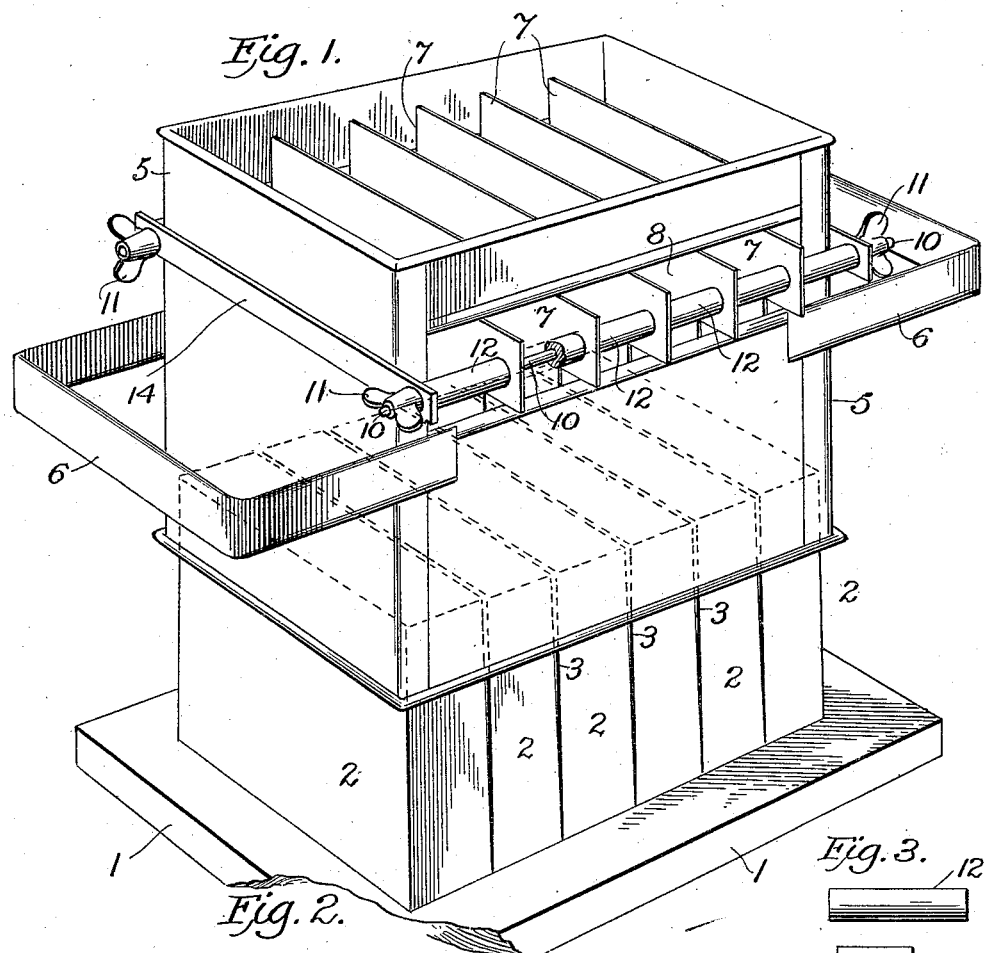
WITNESSES:
James F. Duhamel.
Rita Bradt
INVENTOR
Henry Newcome
BY
Fred E. Packer
ATTORNEY

United States Patent Office.

HENRY NEWCOME, OF BOSTON, MASSACHUSETTS, ASSIGNOR OF ONE-HALF TO EDWARD F. HICKS, OF BOSTON, MASSACHUSETTS.

ICE-CREAM CUTTER.

SPECIFICATION forming part of Letters Patent No. 689,687, dated December 24, 1901.

Application filed September 21, 1901. Serial No. 76,035. (No model.)

*To all whom it may concern:*

Be it known that I, HENRY NEWCOME, a citizen of the United States of America, and a resident of Boston, county of Suffolk, and State of Massachusetts, have invented certain new and useful Improvements in Ice-Cream Cutters, of which the following is a specification.

This invention relates to an improvement in ice-cream cutters, having for its principal object the provision of an effective cutting device by the use of which a brick or other mass of ice-cream or similar substance will be subdivided into equal portions, the operation taking place with much greater symmetry and perfection of shape in the resulting sections as well as more quickly and easily than can possibly be the case when an ordinary knife as commonly used is employed in severing the brick into the subdivisions; and the invention therefore consists, essentially, in the construction, arrangement, and combination of the various parts, substantially as will be hereinafter more fully described and claimed.

In the accompanying drawings, illustrating my invention, Figure 1 is a perspective view of my improved ice-cream cutter shown in its operating position. Fig. 2 is a cross-sectional view of the same and shows the position of one of the cutting-blades and its supporting-frame relatively to a block of cream which is to be severed. Fig. 3 is a detail view of differently-sized spacing or dividing sleeves used in connection with the cutting-blades.

Like numerals of reference denote like parts throughout all the figures of the drawings.

In carrying my invention into practical effect I first construct a series of supports designed to permit the brick or mass of cream which is to be cut to be mounted thereon in such a position that the cutting-blades may have easy access thereto.

In the example of the invention submitted in the drawings, 1 denotes a horizontal plate or board on which is arranged a series of supports 2 2 2 2, the upper faces of which are preferably of rectangular form, as shown, there being between these supports 2 narrow slots or spaces 3 3 3 3, said slots 3 being preferably slightly V-shaped or narrowing in width from the top to the bottom, as is clearly indicated in the drawings in Fig. 1. The aggregate of the top surfaces of the series of supports 2 provides a horizontal platform on which a block of cream, as 4, may rest in the manner indicated in Fig. 2. It will be observed, of course, that under ordinary circumstances the size of the platform or surface formed and provided by the upper faces of the supports 2 will be equal in size to that of a brick or mass of cream to be placed thereon for the purpose of being severed by the cutting-blades into the requisite number of service portions.

The cutting device proper consists of a rectangular metallic frame 5, provided at each end externally with a rigid handle 6. Frame 5 is of suitable size to enable it to embrace the cream brick 4. When the brick is mounted upon the supports, the frame 5 can be made to surround and inclose the same and is further adapted to be pressed down, so that it will surround and inclose the supports, as indicated in Fig. 1. Inside of frame 5 is arranged a series of vertical knives 7 7 7 7, which are supported transversely to the frame at uniform distances apart, there being such number of these knives—say five or more—as may be needed to fashion the required number of subdivisions of the brick of cream. Said knives 7 extend from a point near the upper edge of the rectangular frame 5 downwardly for a convenient distance; but they do not reach to the lower edge of the frame 5, thus leaving the lower portion of the interior of the rectangular frame unprovided with knives, in order that said lower portion of frame 5 may partially embrace and engage the brick of cream before the knives 7 begin to cut thereinto. These knives 7 consist simply of metallic partitions, whose lower edges are sharpened to act as knives adapted to cut into the frozen mass which it is desired to separate into portions. Frame 5 is provided on the two longest sides with longitudinal slots 8 8. The knives 7 are formed at each end with projections 9, which extend through the longitudinal slots 8, said projections having a vertical width substantially equal with the width of the slots, so that they occupy the vertical width of the slots and are susceptible of a horizontal adjustment along throughout the length of the slots. Projections 9 are perforated, and through them pass horizontal rods 10, which engage the cross-strips 14 14 at each end of frame 5. The ends of rods 10 are furnished with thumb-nuts 11, that are adapted to screw up tightly against the cross-bars 14. On the rods 10 and between the perforated projections 9 are spacing sleeves or rings 12 or 13, as the case may be. (See Figs. 1 and 3.) These spacing-sleeves occupy the spaces between the perforated projections 9 and enable the knives to be rigidly and fixedly kept in any desired position of original adjustment. Thus if it is desired to have the ice-cream cut into half a dozen pieces a certain number of cutters—say five—will be employed and the spacing-sleeves will have a certain predetermined equality of length—as, for instance, like the sleeve 12. (Shown in Figs. 1 and 3.) If it be desired to dissect the brick into a dozen pieces, then more cutters—eleven, say—will be utilized. In this case a smaller sleeve—as, for instance, one like that shown at 13 in Fig. 3—will be used, and when sleeves of this size are employed and placed upon the rods 10 between the knives 7 the effect will be to bring the knives much closer together, so that smaller divisions of the brick will be cut. Thus it will be understood that the number of knives 7 in the series may be increased or diminished and that the rigid connection of the greater or less number of cutters with the frame is accomplished and provided for by means of the variable-sized sleeves or rings adapted to be situated on the connecting-rods which lock the cutters firmly in position in the frame. It is desirable, of course, that the cutters be rigidly held in the frame while they are performing their functions and at the same time may be susceptible of such adjustment as is needed to permit pieces of different sizes to be cut, and therefore it will be understood that the means herein disclosed for effecting this object is only one of many means which may be contrived for the same purpose. I reserve the liberty, therefore, of constructing and arranging the knives either fixedly or adjustably in such manner and having such form as may seem best adapted to carry out the purposes of the invention.

The manner of using the cutting device will be quite obvious from the description already given. It will be grasped by means of the handles 6 6, placed above the brick of cream 4 in the position shown in Fig. 1, and then brought down over the cream, so that the knives 7 may cleave through the latter and then enter the slots 3 between the supports 2, and after the cutter has thus descended, so that its knives are within the slots 3, frame 5 will have sufficiently cleared the cream to leave the half a dozen or more pieces or portions thereof which have thus been severed from the brick by the operation of the cutter supported upon the upper faces of the supports 2, whence they may be readily removed for use or for storage in a refrigerator.

Having thus described my invention, what I claim as new, and desire to secure by Letters Patent, is—

1. An ice-cream cutter, consisting of a frame having a plurality of transverse knives arranged therein at uniform distances apart, said knives extending only a part of the distance from the upper edge of the frame to the bottom thereof so as to leave a portion of the frame that may engage the mass of cream before the cutting operation commences.

2. In an ice-cream cutter, the combination with a series of supports having intermediate spaces between them, said supports providing a horizontal face on which a block of cream may rest, of a cutter consisting of a frame having handles and a plurality of transverse knives arranged therein at uniform distances apart, said knives being adapted to be forced through the cream and then caused to enter the spaces between the supports.

3. In an ice-cream cutter, the combination with a series of supports having intermediate spaces between them, said supports providing faces to support a block of cream, of a cutter consisting of a frame having a plurality of transverse knives arranged therein at uniform distances apart, said knives extending only a part of the distance from the upper to the bottom edge of the frame so as to leave a portion of the frame that may engage the cream prior to the commencement of the cutting operation.

4. In an ice-cream cutter, a frame having handles and a plurality of transverse knives which are adjustable relatively to each other so as to be a greater or less distance apart, said knives extending only a part of the distance between the upper and the lower edge of the frame so as to leave a portion of the frame that may engage the mass of cream before the cutting operation commences.

5. In an ice-cream cutter, the combination with a series of supports having intermediate spaces between them, said supports providing horizontal faces on which a block of cream may rest, of a cutter consisting of a frame having a plurality of transverse knives that are adjustable relatively to each other so as to be a greater or less distance apart, said knives being adapted to be forced through the cream and then caused to enter the spaces between the supports.

6. In an ice-cream cutter, a frame having handles and a plurality of transverse knives arranged therein, said knives extending only a part of the distance from the upper to the lower edge of the frame so as to leave a portion of the frame that may engage the mass of cream before the cutting operation commences, supporting-rods for locking said knives in position and spacing-sleeves on the rods between the knives.

7. In an ice-cream cutter, the combination with a series of supports having intermediate spaces between them, said supports providing horizontal faces on which a block of cream may rest, of a cutter consisting of a frame having a plurality of transverse knives, rods passing through said knives and spacing-sleeves on the rods between the knives, substantially as set forth.

Signed at Boston this 13th day of July, 1901.

HENRY NEWCOME.

Witnesses:
LAURA M. HICKS,
RALPH COPELAND.